United States Patent
Heckmann et al.

[11] Patent Number: 6,086,167
[45] Date of Patent: Jul. 11, 2000

[54] METHOD AND DEVICE FOR REGULATING THE PRESSURE IN AT LEAST ONE WHEEL BRAKE

[75] Inventors: Hans Heckmann; Hermann Winner, both of Karlsruhe; Eberhardt Schunck, Landau; Alain Gaillard, Karlsruhe, all of Germany

[73] Assignee: Robert Bosch GmbH, Stuttgart, Germany

[21] Appl. No.: 08/989,016

[22] Filed: Dec. 11, 1997

[30] Foreign Application Priority Data

Dec. 24, 1996 [DE] Germany .................. 196 54 427

[51] Int. Cl.[7] ........................................ B60T 8/60
[52] U.S. Cl. ............................................. 303/155
[58] Field of Search ...................... 303/155, 3, 15, 303/113.4, 166, 174, 177, DIG. 3, DIG. 4, DIG. 10, 11

[56] References Cited

U.S. PATENT DOCUMENTS

| | | | |
|---|---|---|---|
| 5,545,929 | 8/1996 | Fijioka et al. | 303/166 |
| 5,588,718 | 12/1996 | Winner et al. | |
| 5,702,163 | 12/1997 | Stumpe | 303/9.62 |
| 5,720,534 | 2/1998 | Stumpe | 303/166 |
| 5,806,938 | 9/1998 | Stumpe et al. | 303/155 |

FOREIGN PATENT DOCUMENTS

WO95/14595  6/1995  WIPO .

*Primary Examiner*—Robert J. Oberleitner
*Assistant Examiner*—Melanie Talavera
*Attorney, Agent, or Firm*—Kenyon & Kenyon

[57] ABSTRACT

A method and a device for regulating the pressure prevailing in at least one wheel brake. Pressure is regulated in a stepless, continuously variable manner, by a regulator generating at least one driving signal quantity for a pressure-influencing valve arrangement on the basis of the active operating point of the valve arrangement.

18 Claims, 6 Drawing Sheets

METHOD AND DEVICE FOR REGULATING THE PRESSURE IN AT LEAST ONE WHEEL BRAKE

FIELD OF THE INVENTION

The present invention relates to a method and a device for regulating the pressure in at least one wheel brake.

BACKGROUND INFORMATION

International publication No. WO 95/14595 and its corresponding U.S. Pat. No. 5,588,718 describe a hydraulic vehicle-braking system, which works with non-muscular energy and is equipped with valves controlled in intermediate positions by a control unit using current control. In this context, the pressure prevailing in the wheel brakes is detected, compared to the pressure on a master-brake pressure sensor, and the valves are controlled to adjust the pressure settings on the master-brake pressure sensor. Concrete specifications with respect to the regulator to be used in the control unit are not given.

SUMMARY OF THE INVENTION

An object of the present invention is to provide a brake-pressure regulator which adjusts the pressure prevailing in at least one wheel brake.

The present invention achieves this object by making available an essentially stepless, continuously variable pressure regulation using seated valves. By this means, the advantages of these seated valves, such as good seal tightness, low weight and cost-effective manufacturing, are combined with those of proportional valves. Therefore, a pressure modulation characterized by a smooth, graduated response and low noise is achieved with the present invention.

Particularly advantageous in this context is the use of the regulator of the present invention for electrically controlled braking systems, especially for electrohydraulic, non-muscular-energy braking systems. It is especially significant that cost-effective valves, as known from ABS (anti-lock) braking systems, can be used for an electrically controlled braking system of this kind.

The present invention also provides the means for achieving an especially favorable closed-loop control. The active valve operating points are set through defined characteristics, so that to regulate pressure, the pressure regulator uses these adjusted active valve operating points as a basis for the regulation. By this means, a rapid and exact pressure regulation is achieved.

DETAILED DESCRIPTION

Figure 1:
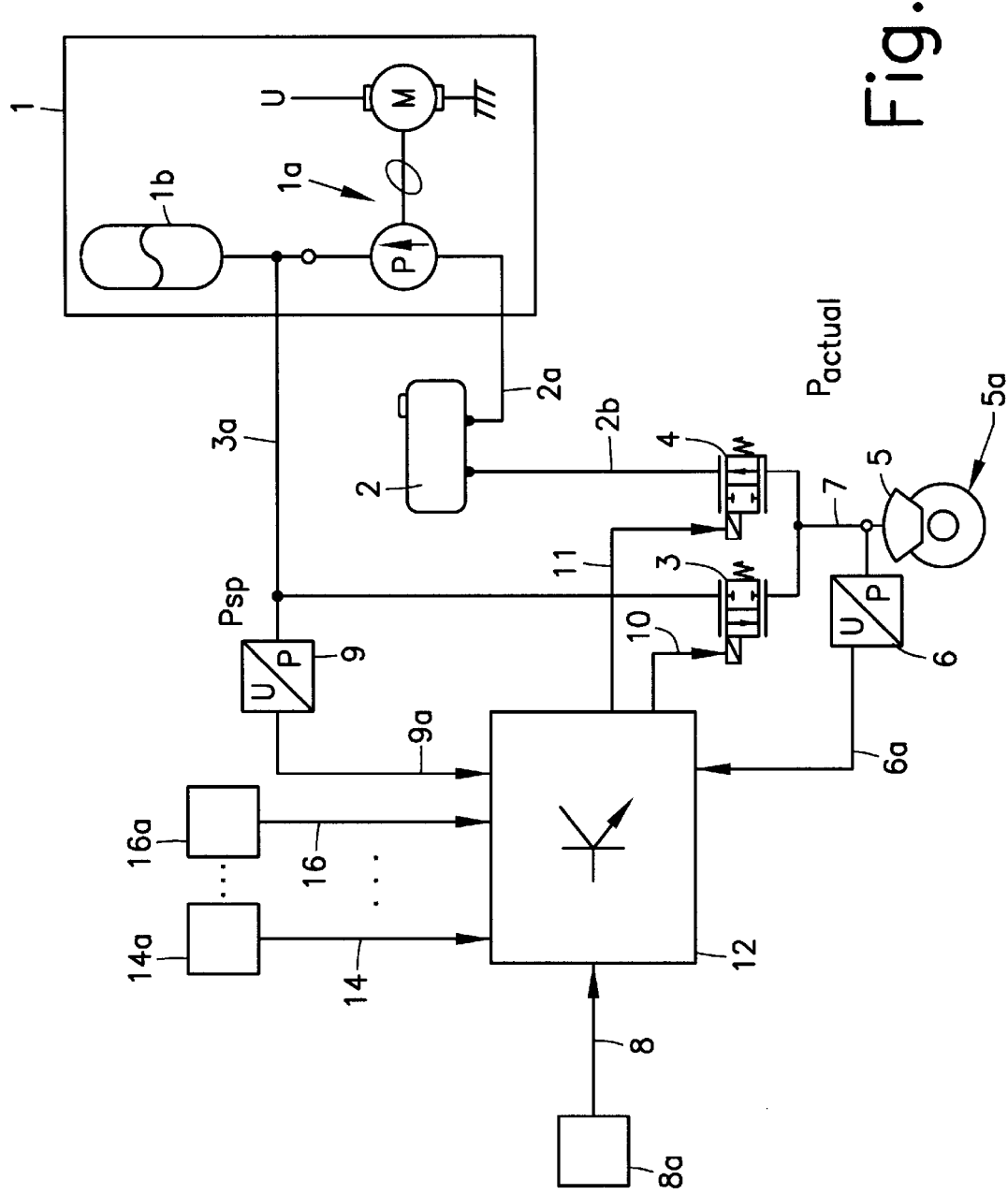
FIG. 1 depicts the design of an electrically controlled braking system.

In FIG. 1, a control system for the braking system of a vehicle is sketched based on the example of a single wheel brake. This includes a conventional pressure supply 1, which can be comprised, for example, of an electrohydraulic pump 1a and of a gas-pressurized piston accumulator 1b. Provision is made, in addition, for a liquid reservoir 2, which feeds pressure supply 1 and takes up the liquid in response to a pressure reduction in the wheel brake. For this purpose, a line 2a connects reservoir 2 to the intake-side inlet of pump 1a, while a second line 2b leads from reservoir 2 to the valve arrangements for controlling the brake pressure in the wheel brake. Brake caliper 5 of wheel 5a is connected via a pressure line 7 to the valve arrangement for controlling the brake pressure in the wheel-brake cylinder. The valve arrangement is comprised in a preferred exemplary embodiment of two solenoid seated valves 3 and 4 for building up and reducing pressure. Solenoid seated valve 3 for pressure build-up is closed in the position that does not permit flow; valve 4 for reducing pressure is open or closed. By way of line 2b, valve 4 is connected to liquid reservoir 2, while valve 3 is connected via a line 3a to pressure supply 1, and there to the delivery line of pump 1a.

To detect the brake pressure in brake caliper 5 of wheel 5a, provision is made for a pressure sensor 6, which senses the pressure prevailing in line 7 or the pressure in the wheel-brake cylinder, as well as the actual pressure $P_{actual}$, and transmits an electrical signal to this effect via line 6a to control unit 12. In a comparable manner, the pressure prevailing in brake line 3a, "accumulator pressure" $P_{sp}$, is detected by a pressure sensor 9, and an electrical signal to this effect is transmitted via line 9a to control unit 12. Via output lines 10 and 11, control unit 12, which comprises, inter alia, the pressure regulator of the present invention, drives solenoid valves 3 and 4 for regulating the brake pressure in brake caliper 5. A measuring device 8a for detecting the driver's braking command, e.g., a path-, force- and/or pressure sensor linked to the brake pedal, feeds an electrical signal responsive to the brake-pedal actuation via line 8 to control unit 12. In addition, measuring devices 14a through 16a detect the motor vehicle's performance quantities and feed said quantities via input lines 14 through 16 to control unit 12 to be evaluated for regulating brake pressure. Performance quantities of this kind are, for example, the wheel speeds, the axle loads, in some instances, atmospheric pressure, etc. These signals are used directly within the scope of conventional anti-lock control, traction control, dynamic driving-response control, axle-load-dependent control, etc., or, in the case of atmospheric pressure, for pressure regulation.

An essential feature of the solenoid-valve arrangement of FIG. 1 is that it has two valve seats, one seat for pressure build-up and one for pressure reduction. This can be realized in one or in two valves, as depicted in the preferred exemplary embodiment according to FIG. 1. In this context, the valve arrangement is hydraulically connected so as to allow the higher pressure to be applied to the side of the seat in question. In addition, for each wheel brake, the valve arrangement has an armature, which is controllable with analog-variable or finely-discretely variable electromagnetic application of force to discrete positions and with a correspondingly variable flow rate. In this context, the electromagnetic application of force opens the armature from the seat for pressure build-up and closes or opens the one from the seat for pressure reduction. Accordingly, the seat for pressure build-up is closed without electromagnetic excitation, while the one for pressure reduction in this state is open or closed.

Via line 8, control unit 12 detects an index for the brake pedal actuation, which it converts, if indicated under consideration of other performance quantities supplied via lines 14 through 16, through evaluation of characteristic curves, characteristics maps, tables or calculation steps, into a nominal pressure $P_{nominal}$, as per the driver's command and to be adjusted under the prevailing operating conditions. This nominal pressure is compared to the actual pressure prevailing in the wheel brake caliper 5, as detected by pressure sensor 6, and is set as a function of the difference within the scope of the pressure regulation by driving at least one of solenoid valves 3, 4. A pressure control loop of this kind is provided for each electrically controllable wheel brake of the vehicle. In the preferred exemplary embodiment, the driving control signals emitted by control unit 12 via lines 10 and 11 are pulse-width modulated signals, which lead to an average excitation current and, thus, to an application of force that brings the valve into the required intermediate position.

In the preferred exemplary embodiment according to FIG. 1, the solenoid valve arrangement is designed with 2/2 two-way valves, which are also used in conventional ABS systems. Moreover, in other exemplary embodiments, one valve having two seats, one armature, and one electrical connection is used, instead of two valves 3 and 4. In addition, besides directly detecting the brake pressure by means of pressure sensor 6, in another exemplary embodiment, the pressure effect can be derived by determining the braking force from deformations in elements of the brake caliper 5 or of their fastenings.

In addition to the above-described use of switched current drivers, which drive the valve arrangement using pulse-width modulated signals, in another exemplary embodiment, current drivers controlled in a closed loop are used. Within the scope of a closed-loop control circuit, the current determined by the pressure regulator is compared as a nominal value to an actual current flowing through the coil of the solenoid valves, sensed at the valve arrangement, and is adjusted accordingly.

Essential for the pressure regulation described in the following is that the force balances of the solenoid valves rise with the pressure in the wheel brake caliper 5 for opening the valve (valve 3) or for keeping the valve (valve 4) closed. The operating points for the closed-loop control are determined from the resultant current-pressure characteristics. An especially favorable closed-loop control action is achieved when the valves through the hydrodynamic forces and through fine analog or discrete modulation of the excitation current in the vicinity of the operating point, are in a stable intermediate state, in which the fluid flow is able to be varied.

Figure 2:
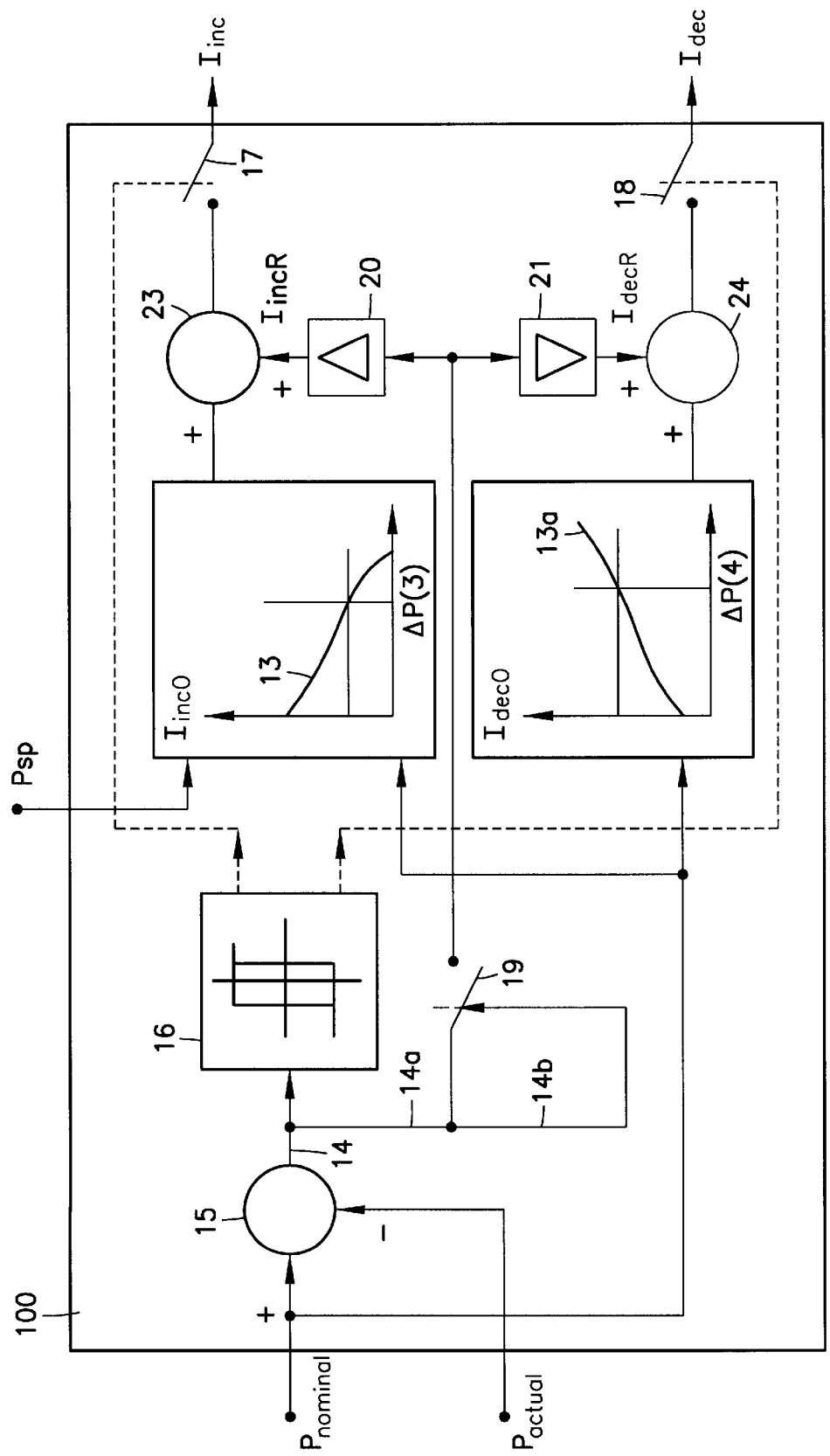
FIG. 2 shows a block diagram for a pressure regulator for the stepless regulation of pressure prevailing in a wheel brake according to an exemplary embodiment of the present invention.

Illustrated in FIG. 2 is pressure regulator 100, realized in a microcomputer of control unit 12. Regulator 100 is supplied with nominal pressure $P_{nominal}$ derived from the brake pedal actuation, actual pressure $P_{actual}$ detected by the pressure sensor, as well as with the ascertained accumulator pressure $P_{sp}$. In addition, in a preferred exemplary embodiment, the atmospheric pressure (pressure prevailing in reservoir 2, not shown) is determined and fed to the pressure regulator 100. Nominal pressure and actual pressure are fed to a comparator 15, which forms the difference between nominal pressure $P_{nominal}$ and actual pressure $P_{actual}$. At the least, this difference is considered in deciding whether to increase or decrease pressure in the wheel brake. For this purpose, the difference is fed via line 14 to a switching element 16 with a hysteresis characteristic. If the difference exceeds a threshold value in a first direction, the output signal of switching element 16 causes a switch 17 to close, and it in turn closes the output line of the regulator for pressure build-up. Correspondingly, the output signal of switching element 16 causes a switch 18 to open or close, and it in turn closes and opens the output line of the regulator for pressure reduction. This takes place when the difference exceeds the threshold value in the second direction.

In addition, the difference is fed via line 14a and via a switch 19 to pressure regulators 20 and 21. The switch opens as a function of the magnitude of the difference supplied to it via line 14b branching off from line 14a. The switch opens and, in this manner, ends the pressure regulation when the difference between the nominal and actual value is essentially zero, i.e., the system is in the adjusted state.

Provision is also made for predefined current-pressure characteristic curves for pressure build-up and pressure reduction. The characteristic curves are supplied in each case with nominal pressure $P_{nominal}$. Accumulator pressure $P_{sp}$ influences characteristic curve 13 for pressure build-up, since the differential pressure at the seat of this valve is the decisive quantity for the balances of forces at the solenoid valve in question. In an ideal pressure supply, characteristic curve 13 is constant, otherwise, the characteristic curve must be adapted to the influence of pressure supply 1 in that by measuring the accumulator pressure, a characteristic curve is selected for the active accumulator pressure. Characteristic curve 13 shows current $I_{inc0}$ as a function of the differential pressure $\Delta P(3)$ at valve 3, i.e., of the difference between accumulator pressure $P_{sp}$ and nominal pressure $P_{nominal}$. For that reason, the measured value of accumulator pressure $P_{sp}$ is fed to the regulator, so that from characteristic curve 13, the operating-point current value $I_{inc0}$ can be derived as a function of the input variables. This value is fed to a summing point 23, where it is feedforwarded to the output signal of regulator 20. Signal $I_{inc}$ corresponding to the adjusted current value is then emitted via switch 17.

Besides characteristic curve 13 for pressure build-up, characteristic curve 13a is shown analogously for pressure reduction. It describes the dependency of current $I_{dec0}$ as a function of the pressure difference $\Delta P(4)$ over reduction valve 4 based on the example of a de-energized, open reduction valve. The pressure difference is the difference between the nominal pressure and the atmospheric pressure prevailing in the reservoir 2. For that reason, characteristic curve 13a is supplied with the nominal pressure $P_{nominal}$ and, optionally, also with the atmospheric pressure $P_{ATM}$, which in the one exemplary embodiment is considered as a fixed value. As a function of the pressure difference, the operating-point current value $I_{dec0}$ is determined for the pressure reduction. The current value ascertained is feedforwarded in a summing point 24 to the output signal of regulator 21. Signal $I_{dec}$ corresponding to the adjusted current value is then emitted via switch 18.

When working with the pressure regulation of the present invention, the hysteresis-afflicted switching element 16 decides on either pressure build-up or pressure reduction as a function of the difference between nominal and actual pressure, by actuating switches 17 and 18. In this context, the hysteresis is predefined by program steps to this effect. However, it can also be part of the mechanical system (e.g., when working with three-position valves). If the difference is positive, i.e., the actual pressure $P_{actual}$ is below the nominal pressure $P_{nominal}$, pressure is built up; if the difference is negative, pressure is reduced. In this context, the transition between pressure build-up and pressure reduction takes place abruptly in the preferred exemplary embodiment. In other exemplary embodiments, this transition takes place with a delay, in that via controlled current ramps, the discontinued operating state and the new operating state are superimposed.

In accordance with a predefined closed-loop control strategy, e.g., within the scope of a proportional control, a proportional-integral control, or a proportional-integral differential control, regulators 20 and 21 define, as a function of the nominal/actual difference, a regulator output signal by means of which the actual pressure value approaches the nominal value.

To adjust the operating point of the solenoid values, with the scope of an open-loop control, a current value is read out from characteristic curves 13 or 13a. This forms a steady-state component as a function of the specific operating point of the valve, which is corrected within the scope of the pressure regulation along the lines of the actual pressure $P_{actual}$ approaching the nominal pressure $P_{nominal}$. If the difference between the actual and nominal pressure is essentially zero, switch 19 is opened and the entire pressure regulation is switched into a passive state. In this case, the valves are in the de-energized state, i.e., solenoid valve 3 is closed and solenoid valve 4 is open or closed. The ascertained drive current values $I_{inc}$ and $I_{dec}$ are output to current controllers or to timed steps, which emit a valve-driving signal corresponding to the magnitude of the current signal.

In the preferred exemplary embodiment, the regulator of the present invention is realized as a microcomputer program. A flow chart is drawn in FIG. 3 to represent a program of this kind. After the program is started at predefined points in time, in first step 200, the requisite quantities nominal value $P_{nominal}$, actual value $P_{actual}$, accumulator pressure value $P_{sp}$ and, optionally, atmospheric pressure $P_{ATM}$ are read in. In subsequent step 202, difference $\Delta P$ is formed from the nominal pressure $P_{nominal}$ and the actual pressure $P_{actual}$. It is then checked in step 203 whether the closed-loop control is in the adjusted state, i.e., whether the actual value essentially corresponds to the nominal value. This is preferably achieved by comparing the difference to a limiting value which is zero or close to zero. If the closed-loop control is in the adjusted state, the quantities $I_{inc}$ and $I_{dec}$ to be output are switched to zero in accordance with step 230, i.e., the control is switched to the passive state. If the adjusted state is not reached, it is checked in step 204 whether a pressure build-up should take place. This is carried out on the basis of the pressure difference as dictated by a hysteresis. If the pressure difference is above the threshold value for the pressure build-up, then in accordance with step 206, the steady-state operating point current $I_{inc0}$ is read out from characteristic curve 13 as a function of the difference between accumulator pressure $P_{sp}$ and nominal pressure $P_{nominal}$. In accordance with step 212, regulator value $I_{incR}$ is then calculated on the basis of the active differential value as dictated by the regulator strategy used. In step 214, current value $I_{inc}$ to be output is then formed from the sum of operating point value $I_{inc0}$ and of regulator value $I_{incR}$ and, in accordance with step 216, output to the drivers or to the solenoid valve in question.

If the threshold value is undershot in step 204, the pressure is reduced. This takes place in accordance with step 218, initially by defining basic value $I_{dec0}$ for the adjusted operating point as a function of the difference between nominal pressure, $P_{nominal}$, and atmospheric pressure, $P_{ATM}$ (which in some instances is set to zero). Then, in accordance with step 224, the regulator component (proportional part) $I_{decR}$ is calculated on the basis of the active difference. In subsequent step 226, current value $I_{dec}$ to be output is determined from the sum of operating point value $I_{dec0}$ and of regulator value $I_{decR}$, and output in subsequent step 228. Following steps 216, 228 or 230, the program segment is ended and run through again at a specified point in time.

Figure 4A:
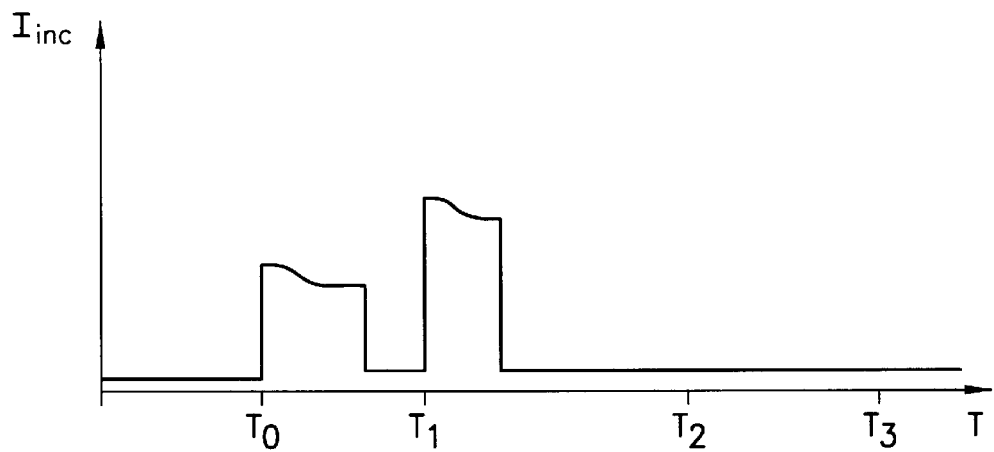
FIG. 4a shows a typical time characteristic curve of variable $I_{inc}$ for pressure build-up.
Figure 4B:
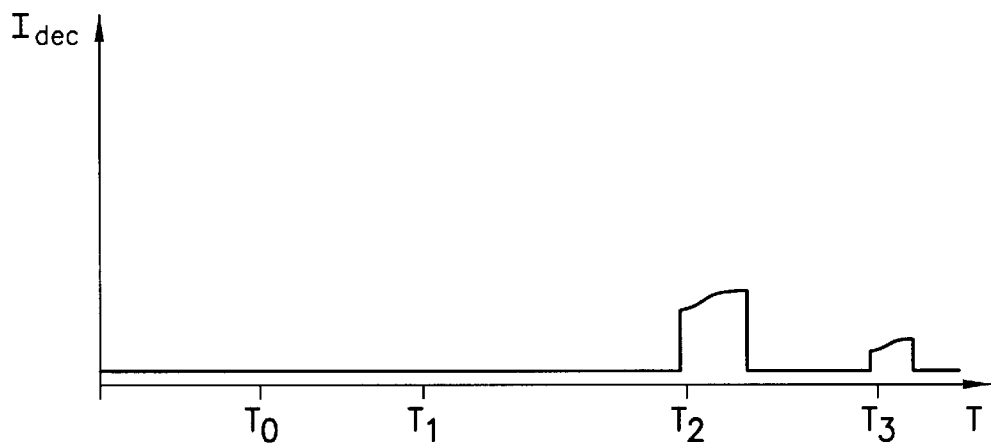
FIG. 4b shows a typical time characteristic curve of variable $I_{dec}$ for pressure reduction.
Figure 4C:
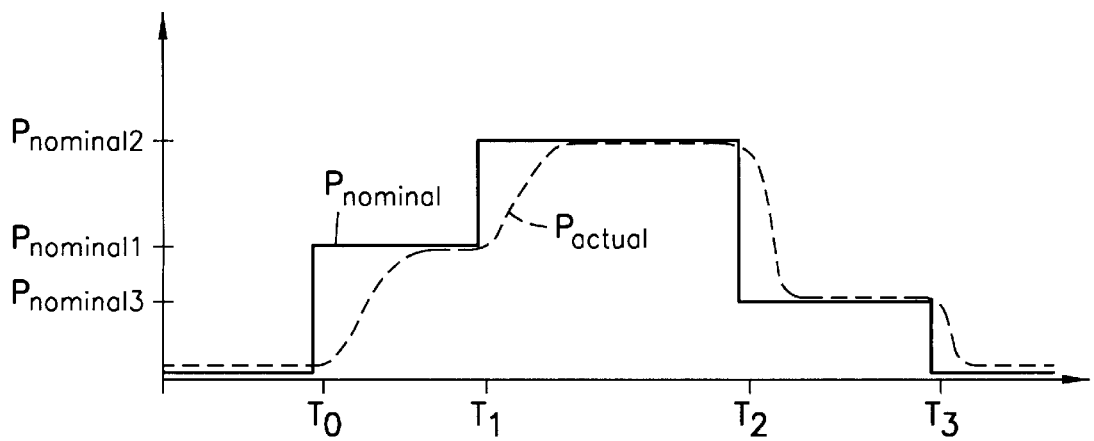
FIG. 4c shows a typical time characteristic curve of nominal pressure, $P_{nominal}$, and actual pressure, $P_{actual}$, for a wheel brake.

FIGS. 4a–4c illustrate time characteristics of important variables to represent the method of functioning of regulator 100. FIG. 4a shows the time characteristic of current signal $I_{inc}$ for pressure build-up; FIG. 4b that for pressure reduction ($I_{dec}$), while in FIG. 4c, the time characteristic of nominal ($P_{nominal}$) and actual pressure ($P_{actual}$) is plotted.

Up to an instant $T_0$, no braking operation takes place. At instant $T_0$, the driver actuates the brake pedal, so that a defined nominal pressure value $P_{nominal1}$ is specified. At instant $T_1$, the driver presses down the pedal more, so that the nominal value continues to increase ($P_{nominal2}$). At instant $T_2$, the driver releases the brake pedal somewhat. The nominal value drops ($P_{nominal3}$). At instant $T_3$, the braking operation is ended, the driver has completely released the pedal, and the nominal value is zero. For the sake of simplicity, it is assumed that the brake pedal position and the nominal pressure are unchanged in each case between instants $T_0$ and $T_1$, $T_1$ and $T_2$, and $T_2$ and $T_3$. At the beginning of the braking operation at instant $T_0$, a large deviation arises between the nominal and actual pressure. There is also a pressure difference between the accumulator pressure $P_{sp}$ and the nominal pressure. In accordance with characteristic curve 13, at instant $T_0$, the operating point of the valve is such that a current value $I_{inc0}$ is output, which opens the build-up valve. In addition, regulator 20 opens the valve as a result of the large nominal-actual deviation. Pressurized media flows in the wheel brake. This causes the difference between nominal and actual value to drop. Shortly before the actual value corresponds to the nominal value, build-up current $I_{inc}$ is essentially made steady through operating point value $I_{inc0}$, and the valve is retained in a specified intermediate position. If the difference between nominal and actual value is within the scope of tolerances, the current is switched off and the valve is closed (compare FIG. 4a, between $T_0$ and $T_1$). At instant $T_1$, the nominal value continues to rise. The current (and thus the valve position) is increased at instant T1 to the active operating point $I_{inc0}$ and, from this operating point, the pressure regulation is started analogously at instant $T_0$.

If the actual value corresponds to the nominal value, the regulation is switched off. Such an action is apparent at instants $T_2$ and $T_3$ when the driver releases the pedal in the illustrated example in two stages. At instant $T_2$, one starts out from a large nominal/actual difference, a difference also existing between nominal pressure and atmospheric pressure. In accordance with characteristic curve 13a, this results in the operating point value $I_{dec0}$. At instant $T_2$, the reduction current and, thus, the valve position are initially set to the cumulative value of the characteristic current $I_{dec0}$ and regulator current $I_{decR}$ and increased when the actual value is approached. If the actual value corresponds to the nominal value, the closed-loop control is switched off. At instant $T_3$, the driver completely releases the pedal. The operating point current value is adjusted in conformance with the nominal pressure of zero, it being smaller in terms of absolute value than at instant $T_2$ because of the diminished difference between the nominal pressure and the atmospheric pressure. By way of the regulator, the braking pressure is then reduced to 0, the closed-loop control being switched off when the actual value corresponds substantially to the nominal value.

Figure 5:
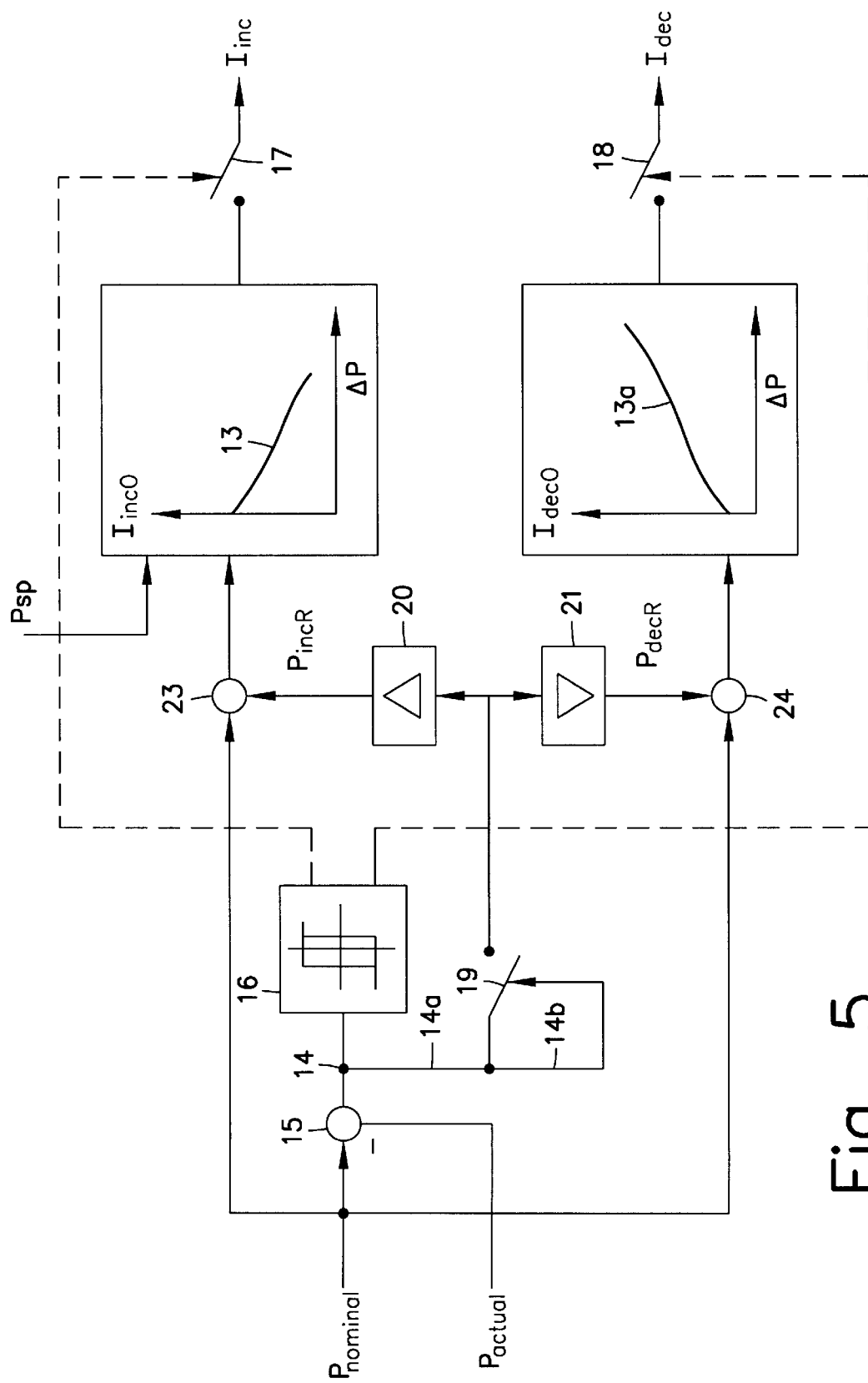
FIG. 5 shows a block diagram for a pressure regulator for the stepless regulation of pressure prevailing in a wheel brake according to an alternative exemplary embodiment of the present invention.
Figure 6:
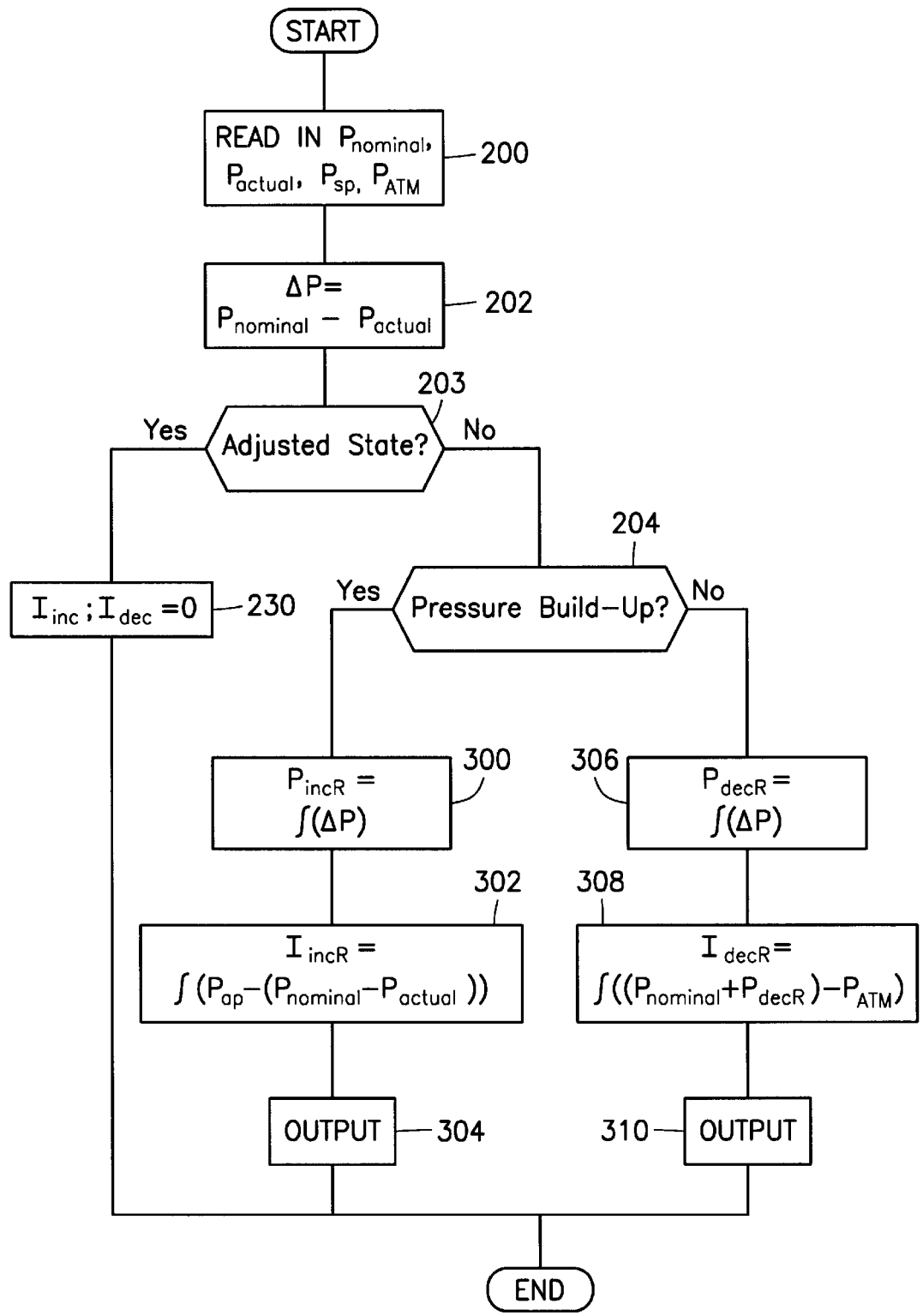
FIG. 6 shows a microcomputer program flow used in a control unit according to an alternative exemplary embodiment of the regulator of the present invention.

FIGS. 5 and 6 show a second advantageous exemplary embodiment of the present invention.

In this context, as depicted in FIG. 5, characteristic curves 13 and 13a are arranged following regulators 20 and 21. The system deviation (line 14) is fed via switch 19 described above directly to regulators 20 and 21. As a function of the deviation and their control strategy, said regulators generate output signals $P_{incR}$ or $P_{decR}$, which are feedforwarded to nominal value $P_{nominal}$ in summing points 23 and 24. $P_{incR}$ and $P_{decR}$ represent correction values for the nominal pressure, which lead to the actual pressure being adjusted to the nominal pressure. Combinations of the two variables are conducted to characteristic curve 13 or 13a, from where, as described above, output signals $I_{inc}$ or $I_{dec}$ are generated as a function of the difference between the corrected nominal pressure and accumulator pressure $P_{sp}$ or the atmospheric pressure $P_{ATM}$.

Figure 3:
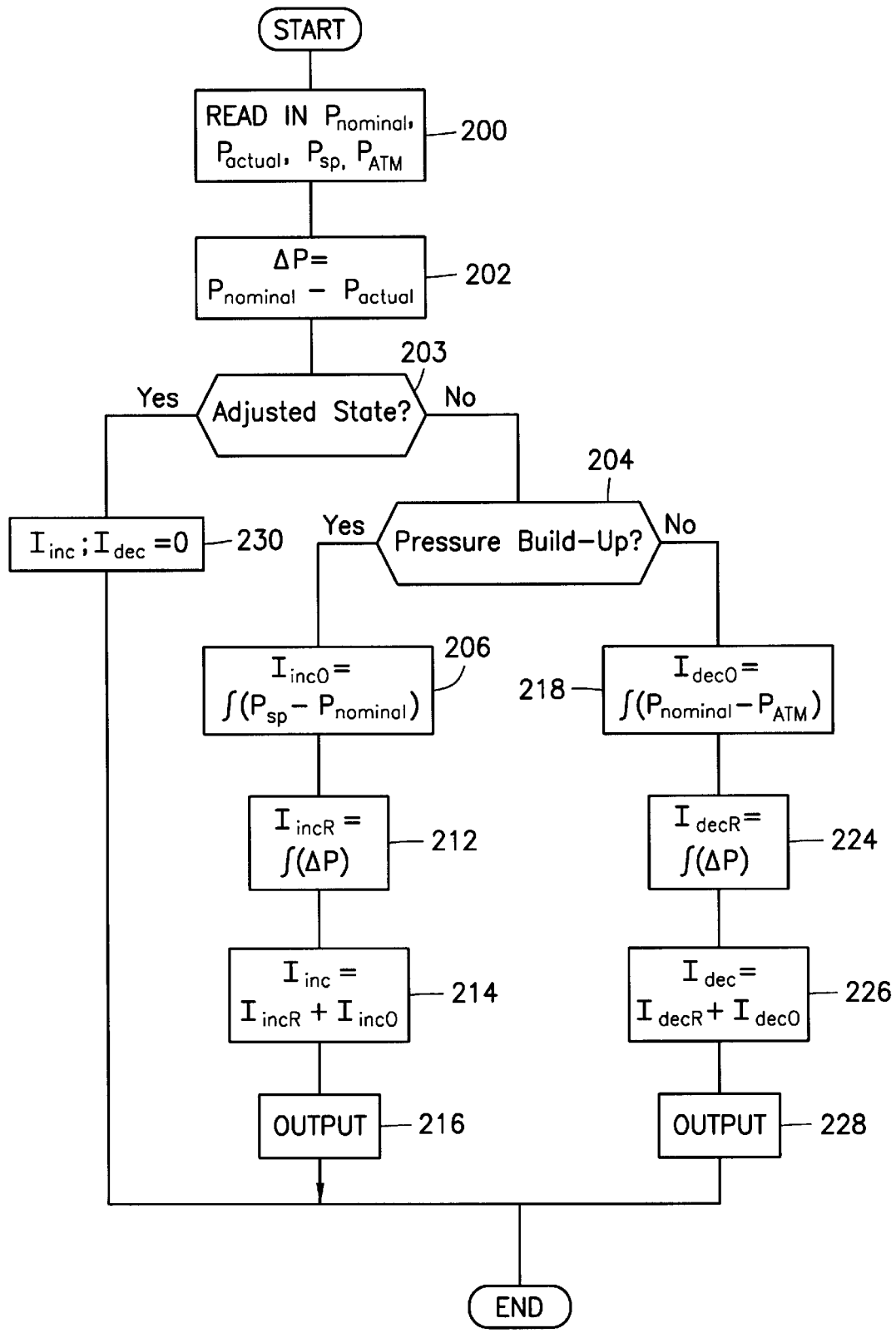
FIG. 3 shows a microcomputer program flow used in a control unit according to a preferred exemplary embodiment of the regulator of the present invention.

The flow chart depicted in FIG. 3 is altered in this manner (see FIG. 6). Steps 200, 202, 203, 204 and 230 remain the same. Reference is made to the description for FIG. 3. If a pressure build-up takes place, correcting quantity $P_{incR}$ is initially formed in step 300 by the regulator on the basis of the system deviation. Then, in accordance with step 302, from characteristic curve 13, quantity $I_{inc}$ is calculated as a function of the difference from the accumulator pressure $P_{sp}$ and the sum of the nominal value $P_{nominal}$ and the correction value $P_{incR}$, and is output in step 304. Analogously for the pressure reduction in step 306, correction quantity $P_{decR}$ is calculated as a function of the differential pressure; from characteristic curve 13a, quantity $I_{dec}$ is read out (step 308) as a function of the difference from the sum of the nominal value $P_{nominal}$ and correction value $P_{decR}$ with the atmospheric pressure $P_{ATM}$, and output in accordance with step 310. Following steps 304 or 310, the program is ended and repeated at the next point in time.

In an alternative exemplary embodiment, provision is made for the use of one regulator, which is loaded with the appropriate parameters for either pressure build-up or reduction.

In the first exemplary embodiment, characteristic curves 13 and 13a are alternatively a function of actual pressure $P_{actual}$, instead of nominal pressure $P_{nominal}$.

What is claimed is:

1. A method for regulating a pressure in at least one wheel brake, comprising the steps of:

predefining a nominal pressure for the wheel brake;

detecting an actual pressure in the wheel brake;

storing a characteristic curve for a pressure build-up and a characteristic curve for a pressure reduction, wherein the characteristic curves describe at least one driving signal as a function of a pressure difference across the valve arrangement;

generating at least one driving signal as a function of the pressure difference across the valve arrangement according to the characteristic curves; and driving the valve arrangement as a function of the driving signal to change the actual pressure in the wheel brake so as to provide a stepless, continuously variable pressure regulation.

2. The method according to claim 1, wherein the at least one active operating point of the valve arrangement is predefined in the characteristic curve for the pressure build-up as a function of the difference between an accumulator pressure and the nominal pressure or the actual pressure, and in the characteristic curve for the pressure reduction as a function of the difference between the nominal pressure or the actual pressure and an atmospheric pressure.

3. The method according to claim 1, wherein the valve arrangement includes at least one seated valve.

4. The method according to claim 1, wherein the valve arrangement includes a first seated valve for a pressure build-up and a second seated valve for a pressure reduction.

5. The method according to claim 1, further comprising the step of using a regulator to generate an output quantity as a function of a difference between the nominal pressure and the actual pressure.

6. The method according to claim 5 further comprising the step of feedforwarding a value for the at least one active operating point of the valve arrangement to the regulator output quantity.

7. The method according to claim 1, further comprising the step of switching off the pressure regulation upon attainment of an adjusted state.

8. The method according to claim 1, further comprising the step of forming a pressure correction value as a function of a difference between the nominal pressure and the actual pressure.

9. A method for regulating a pressure in at least one wheel brake, comprising the steps of:

predefining a nominal pressure for the wheel brake;

detecting an actual pressure in the wheel brake;

generating at least one driving signal as a function of at least one active operating point of a valve arrangement; and driving the valve arrangement as a function of the driving signal to change the actual pressure in the wheel brake so as to provide a stepless, continuously variable pressure regulation, wherein at least one valve of the valve arrangement can be driven to an intermediate position between a completely open position and a completely closed position, by the driving signal.

10. A method for regulating a pressure in at least one wheel brake, comprising the steps of:

predefining a nominal pressure for the wheel brake;

detecting an actual pressure in the wheel brake;

generating at least one driving signal as a function of at least one active operating point of a valve arrangement;

driving the valve arrangement as a function of the driving signal to change the actual pressure in the wheel brake so as to provide a stepless, continuously variable pressure regulation;

measuring a current intensity flowing through a coil of the valve arrangement; and adjusting the driving signal using the measured current intensity.

11. A method for regulating a pressure in at least one wheel brake, comprising the steps of:

predefining a nominal pressure for the wheel brake;

detecting an actual pressure in the wheel brake;

storing a characteristic curve for a pressure build-up, wherein the characteristic curve describes a driving signal as a function of a pressure difference across the valve arrangement;

generating the driving signal as a function of at least one active operating point of a valve arrangement, wherein the at least one active operating point of the valve arrangement is predefined in the pressure build-up characteristic curve as a function of the difference between an accumulator pressure and the nominal pressure or the actual pressure; and driving the valve arrangement as a function of the driving signal to change the actual pressure in the wheel brake so as to provide a stepless, continuously variable pressure regulation.

12. A method for regulating a pressure in at least one wheel brake, comprising the steps of:

predefining a nominal pressure for the wheel brake;

detecting an actual pressure in the wheel brake;

storing a characteristic curve for a pressure reduction, wherein the characteristic curve describes the driving signal as a function of a pressure difference across the valve arrangement;

generating the driving signal as a function of the pressure difference across the valve arrangement according to the characteristic curve, wherein at least one active operating point of the valve arrangement is predefined in the pressure reduction characteristic curve as a function of the difference between the nominal pressure or the actual pressure and an atmospheric pressure; and driving the valve arrangement as a function of the driving signal to change the actual pressure in the wheel brake so as to provide a stepless, continuously variable pressure regulation.

13. A method for regulating a pressure in at least one wheel brake, comprising the steps of:

predefining a nominal pressure for the wheel brake;

detecting an actual pressure in the wheel brake;

forming a pressure correction value as a function of the difference between the nominal pressure and the actual pressure, and feedforwarding the pressure correction value to the nominal pressure;

generating at least one driving signal as a function of at least one active operating point of a valve arrangement, wherein the driving signal is determined from a characteristic curve as a function of the nominal pressure and the pressure correction value; and driving the valve arrangement as a function of the driving signal to change the actual pressure in the wheel brake so as to provide a stepless, continuously variable pressure regulation.

14. A device for regulating a pressure in at least one wheel brake, comprising:

an electronic control unit including at least one regulator for providing an output signal to drive a valve arrangement including at least one seated valve for changing the pressure in the wheel brake so as to provide a stepless, continuously variable pressure regulation, the at least one regulator providing the output signal as a function of at least one active operating point of the valve arrangement, wherein the electronic unit includes a characteristic curve for a pressure build-up and a characteristic curve for a pressure reduction, and wherein the characteristic curves describe the output signal as a function of a pressure difference across the valve arrangement.

15. An apparatus for regulating at least one wheel brake pressure, comprising:

at least one pressure sensor that detects at least one actual wheel brake pressure;

a generating arrangement that outputs at least one driving signal using at least one active operating point of a valve arrangement, wherein the generating arrangement stores a characteristic curve for a pressure build-up and a characteristic curve for a pressure reduction, and wherein the characteristic curves describe the at least one driving signal as a function of a pressure difference across the valve arrangement; and a driving arrangement that receives the at least one driving signal and drives the valve arrangement to change the at least one actual wheel brake pressure.

16. An apparatus for regulating at least one wheel brake pressure, comprising:

at least one pressure sensor that detects at least one actual wheel brake pressure;

a generating arrangement that outputs at least one driving signal using at least one active operating point of a valve arrangement, wherein the active operating point is defined as a current corresponding to a particular pressure difference across the valve arrangement, and the generating arrangement stores at least one of a characteristic curve for a pressure build-up and a characteristic curve for a pressure reduction, and wherein the characteristic curves describe the at least one driving signal as a function of a pressure difference across the valve arrangement; and a driving arrangement that receives the at least one driving signal and drives the valve arrangement to change the at least one actual wheel brake pressure.

17. An apparatus for regulating at least one wheel brake pressure, comprising:

means for sensing at least one actual wheel brake pressure;

means for generating at least one driving signal using at least one active operating point of a valve arrangement, wherein the means for generating stores a characteristic curve for a pressure build-up and a characteristic curve for a pressure reduction, and wherein the characteristic curves describe the at least one driving signal as a function of a pressure difference across the valve arrangement; and means for receiving the at least one driving signal and driving the valve arrangement to change the at least one actual wheel brake pressure.

18. An apparatus for regulating at least one wheel brake pressure, comprising:

means for sensing at least one actual wheel brake pressure;

means for generating at least one driving signal using at least one active operating point of a valve arrangement, wherein the active operating point is defined as a current corresponding to a particular pressure difference across the valve arrangement, and the means for generating stores at least one of a characteristic curve for a pressure build-up and a characteristic curve for a pressure reduction, and wherein the characteristic curves describe the at least one driving signal as a function of a pressure difference across the valve arrangement; and means for receiving the at least one driving signal and driving the valve arrangement to change the at least one actual wheel brake pressure.

* * * * *